(12) United States Patent
Shanbhag et al.

(10) Patent No.: US 10,242,480 B2
(45) Date of Patent: Mar. 26, 2019

(54) ANIMATED GLYPH BASED ON MULTI-AXIS VARIABLE FONT

(71) Applicant: Microsoft Technology Licensing, LLC, Redmond, WA (US)

(72) Inventors: Shrinath Shanbhag, Redmond, WA (US); Worachai Chaoweeraprasit, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 6 days.

(21) Appl. No.: 15/449,430

(22) Filed: Mar. 3, 2017

(65) Prior Publication Data

US 2018/0253883 A1 Sep. 6, 2018

(51) Int. Cl.
*G06F 17/21* (2006.01)
*G06T 13/80* (2011.01)
*G06T 11/20* (2006.01)

(52) U.S. Cl.
CPC ............ *G06T 13/80* (2013.01); *G06F 17/214* (2013.01); *G06T 11/203* (2013.01)

(58) Field of Classification Search
None
See application file for complete search history.

(56) References Cited

U.S. PATENT DOCUMENTS

| | | | |
|---|---|---|---|
| 4,600,919 A | 7/1986 | Stern | |
| 6,034,697 A | 3/2000 | Becker | |
| 6,404,435 B1 | 6/2002 | Miller et al. | |
| 6,504,545 B1 | 1/2003 | Browne et al. | |
| 6,674,437 B1 | 1/2004 | Rose et al. | |
| 6,760,029 B1 | 7/2004 | Phinney et al. | |
| 7,199,805 B1 | 4/2007 | Langmacher et al. | |
| 7,730,403 B2 | 6/2010 | Johnson et al. | |
| 8,012,019 B2 | 9/2011 | Escalera et al. | |

(Continued)

FOREIGN PATENT DOCUMENTS

WO 2010033591 A1 3/2010

OTHER PUBLICATIONS

Prepressure.com, Multiple Master Fonts, May 8, 2016, Wayback Machine (http://archive.org/web/), http://www.prepressure.com:80/fonts/basics/multiple-master.*

(Continued)

*Primary Examiner* — Xiao M Wu
*Assistant Examiner* — Steven Z Elbinger
(74) *Attorney, Agent, or Firm* — Arent Fox LLP

(57) ABSTRACT

Methods and devices for animating variable fonts may include receiving a request to animate one or more glyphs of a variable font in a design space based on one or more animation parameters. The methods and devices may also include determining an animation path in the design space for the one or more glyphs based on the animation parameters and calculating a set of keyframes having respective keyframe positions along the animation path. The methods and devices may include constructing glyph outline data of the one or more glyphs for each keyframe in the set of keyframes. The methods and devices may include generating intermediate glyph outline data at one or more intermediate positions between the keyframe positions and transmitting the glyph outline data and the intermediate glyph outline data.

20 Claims, 15 Drawing Sheets

(56) References Cited

U.S. PATENT DOCUMENTS

| | | | |
|---|---|---|---|
| 9,454,838 B2 | 9/2016 | Chann et al. | |
| 2006/0044312 A1* | 3/2006 | Loop | G06T 11/203 |
| | | | 345/443 |
| 2006/0227142 A1* | 10/2006 | Brown | G06F 17/211 |
| | | | 345/473 |
| 2006/0232589 A1* | 10/2006 | Glein | G06F 8/38 |
| | | | 345/473 |
| 2008/0005212 A1* | 1/2008 | Levien | G06T 11/203 |
| | | | 708/275 |
| 2009/0097765 A1* | 4/2009 | Kimura | G06K 9/48 |
| | | | 382/243 |
| 2009/0228784 A1 | 9/2009 | Drieu et al. | |
| 2011/0249013 A1 | 10/2011 | Jones et al. | |
| 2014/0085311 A1 | 3/2014 | Gay et al. | |
| 2015/0161811 A1* | 6/2015 | Gehani | G06T 13/80 |
| | | | 345/473 |

OTHER PUBLICATIONS

Lie, et al., "Critical design and realization aspects of glyph-based 3D data visualization", In Proceedings of the 25th Spring Conference on Computer Graphics, Apr. 23, 2009, pp. 19-26.

"International Search Report and Written Opinion Issued in PCT Application PCT Application PCT/US18/019614", dated May 23, 2018., 10 Pages.

Sherman, Nick, "Variable Fonts for Responsive Design", http://alistapart.com/blog/post/variable-fonts-for-responsive-design, Jan. 23, 2015, 9 Pages.

\* cited by examiner

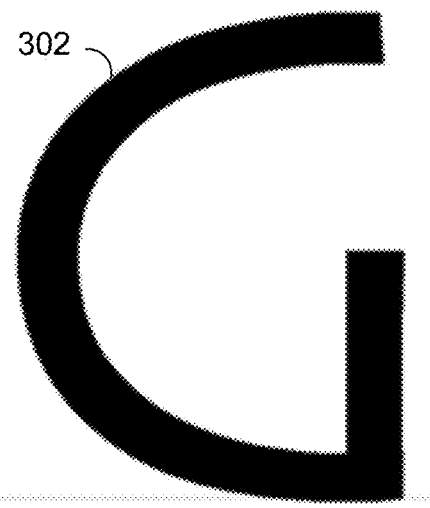
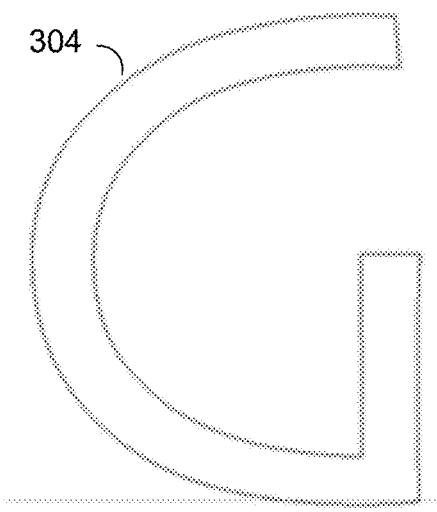
FIG. 3A　　　　　　　　　FIG. 3B
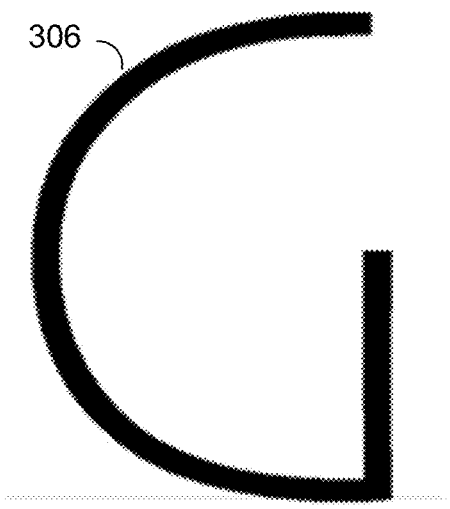
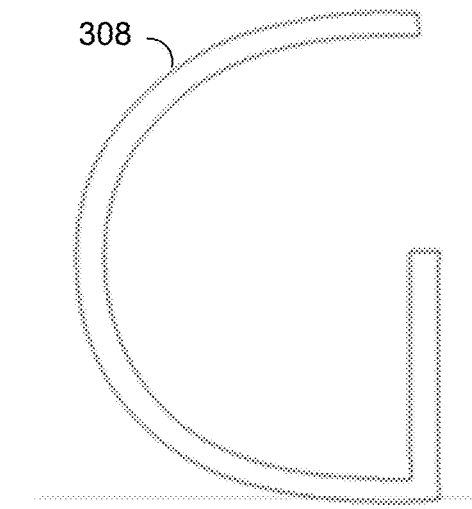
FIG. 3C　　　　　　　　　FIG. 3D

FIG. 4A  FIG. 4B

ANIMATED GLYPH BASED ON MULTI-AXIS VARIABLE FONT

BACKGROUND

The present disclosure relates to multi-axis fonts, and more particularly, to use of multi-axis fonts on a computer device.

Fonts define the visual appearance of glyphs, which have typically been static two dimensional (2D) definitions, or more recently 2D definitions with pre-defined animations. The appearance of text is generally defined by font files (e.g., Calibri, Arial). Traditionally, fonts have been amenable to reuse across various applications. When any application instances a font at a specific size, for example Arial size 12, all the font data that is generated for that font size, Arial size 12 in this example, is shareable across every other application requesting the same font size combination for drawing text, generally by caching the intermediate results. For example, when an application needs to render text, the application may ask a text processing component, such as DirectWrite, to create a font face, if the font face data is cached, DirectWrite returns the requested font face to the application. If the font face is not cached, DirectWrite reads the desired information from the font file, caches the data in the font file, and returns the requested font face to the application, which is ill-suited for animating fonts.

For each unique design axis instance created by the application, DirectWrite computes the font outlines from the font file and updates the font cache. Animations are typically redrawn at about 60 frames per second. So the application animating the text needs to create a large number of font instances. Unlike for the non-varying text case, font instances created for animation have a low probability of cross application reuse. As a result, caching them in the traditional font cache results in a lot of wasted space. An even worse consequence is that perfectly shareable font instances can get evicted as the cache overflows because of the sheer number of font instances that get created for animation.

As such, existing techniques for animating glyphs either require significant frame-over-frame processing time or frame-over-frame storage space, or both. Prior solutions include repeated rendering of different image content, such as in the case of animated graphics interchange format (GIF), which requires both significant processing time to decode each image frame and significant storage space to store the image frames both in memory and persistent storage. In addition, prior solutions are not scalable across the output resolution (e.g., dots per inch, pixels per inch) of a display.

Thus, there is a need in the art for improvements in animated fonts.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, an operating system in communication with the memory and processor. The operating system may be operable to receive a request to animate one or more glyphs of a variable font in a design space based on one or more animation parameters, determine an animation path in the design space for the one or more glyphs based on the animation parameters, calculate a set of keyframes having respective keyframe positions along the animation path, construct glyph outline data of the one or more glyphs for each keyframe in the set of keyframes, generate intermediate glyph outline data at one or more intermediate positions between the keyframe positions, and transmit the glyph outline data and the intermediate glyph outline data.

Another example implementation relates to a method for animating variable fonts. The method may include receiving, at an operating system executing on a computer device, a request to animate one or more glyphs of a variable font in a design space based on one or more animation parameters. The method may also include determining, at the operating system, an animation path in the design space for the one or more glyphs based on the animation parameters. In addition, the method may include calculating a set of keyframes having respective keyframe positions along the animation path. The method may include constructing glyph outline data of the one or more glyphs for each keyframe in the set of keyframes. The method may include generating intermediate glyph outline data at one or more intermediate positions between the keyframe positions. The method may also include transmitting the glyph outline data and the intermediate glyph outline data.

Another example implementation relates to computer-readable medium storing instructions executable by a computer device. The computer-readable medium may include at least one instruction for causing the computer device to receive a request to animate one or more glyphs of a variable font in a design space based on one or more animation parameters. The computer-readable medium may include at least one instruction for causing the computer device to determine an animation path in the design space for the one or more glyphs based on the animation parameters. The computer-readable medium may include at least one instruction for causing the computer device to calculate a set of keyframes having respective keyframe positions along the animation path. The computer-readable medium may include at least one instruction for causing the computer device to construct glyph outline data for the one or more glyphs for each keyframe in the set of keyframes. The computer-readable medium may include at least one instruction for causing the computer device to generate intermediate glyph outline data at one or more intermediate positions between the keyframe positions. The computer-readable medium may include at least one instruction for causing the computer device to transmit the glyph outline data and the intermediate glyph outline data.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIGS. 3A-3D illustrate example glyph outline data in accordance with an implementation of the present disclosure;

FIGS. 4A-4C illustrate example variation deltas from a default glyph value to a non-default glyph value in accordance with an implementation of the present disclosure;

DETAILED DESCRIPTION

The present disclosure provides systems and methods for presenting animation of glyphs in a variable font. Variable fonts may support one or more axes of variation. Each axes of variation may define a range of possible values between a minimum value and a maximum value for a particular axis. The axes of variation may define a variation design space for animating glyphs of the variable fonts. Whereas a fixed-axis font describes a single typeface, a multi-axis variable font may describe an indefinite number of typefaces belonging to a single font family. The various axes in the multi-axis font may be used to define animations of glyphs. Animation may include, but is not limited to, zooming in and zooming out on the glyphs, stretching glyphs outwards and inwards, glyphs bouncing up and down on a display, and moving glyphs outwards to provide an opening where new glyphs may be inserted into a sentence and moving the glyphs inwards after insertion. The present disclosure provides systems and methods that use a font glyph interpolation process for multi-axis variable fonts, along with existing graphics processing unit (GPU) glyph caching techniques, to significantly reduce frame-over-frame processing time while allowing for compact representation of various keyframes using font variation deltas. The present disclosure establishes an efficient way to render variable fonts in an animation sequence.

The present disclosure treats the animation of multi-axis variable fonts differently than static text. Rather than populating a font cache, the systems and methods of this disclosure may calculate a number of keyframes along an animation path that an application intends to use for the animation of the multi-axis variable font and may store the keyframes locally. The systems and methods may evaluate glyph outlines at the keyframe positions. At intermediate positions, the systems and methods may generate corresponding intermediate glyph outlines by interpolating between the nearest two keyframes (e.g., one on each side of the intermediate position) without loss of any information. Thus, efficient rendering may be facilitated by constructing glyph outline data at keyframe positions and exposing the glyph outline data to renderers.

Figure 1:
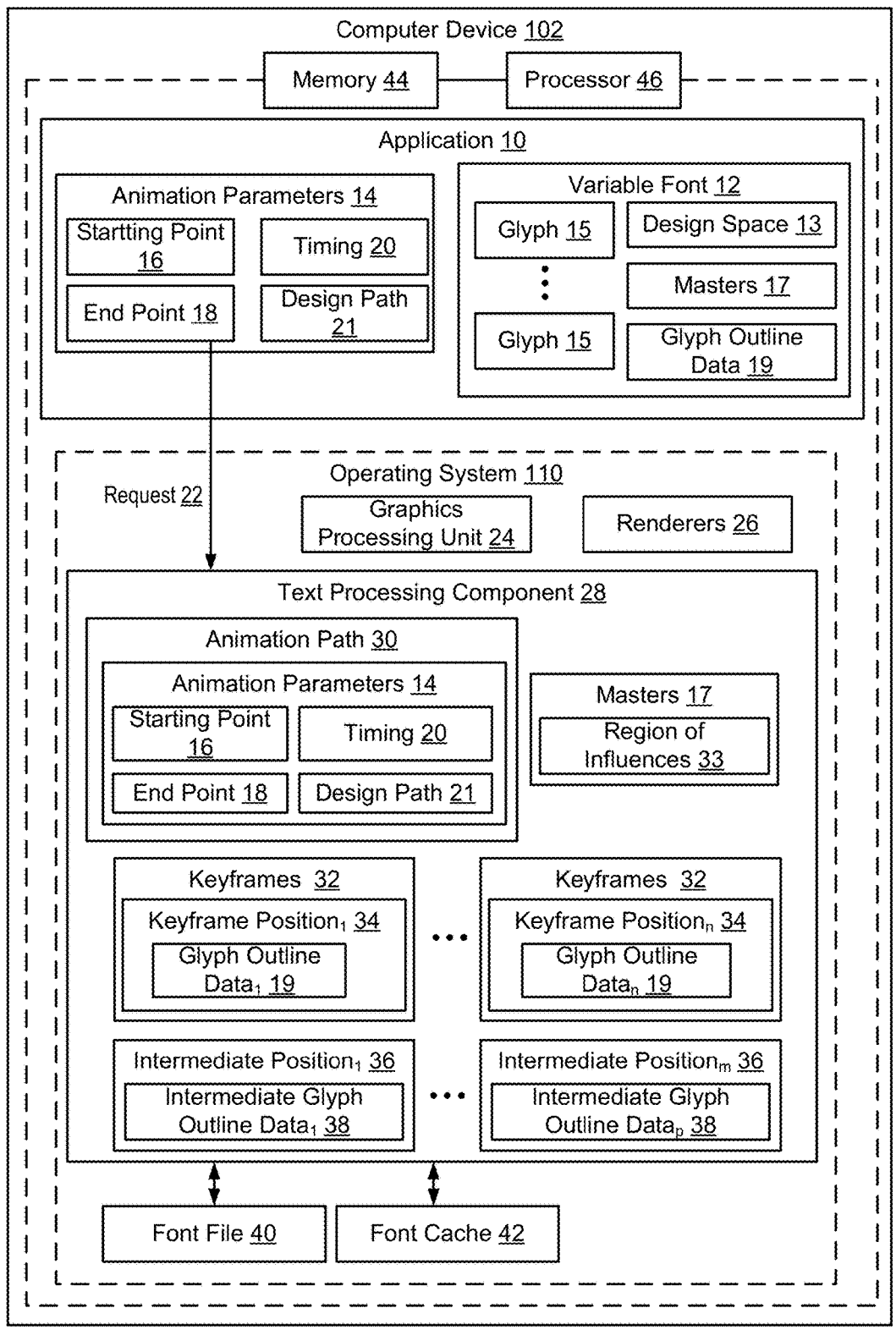
FIG. 1 is a schematic block diagram of an example device in accordance with an implementation of the present disclosure.

Referring now to FIG. 1, an example computer device 102 for use in connection with animating a variable font 12 may include an operating system 110 executed by processor 46 and/or memory 44 of computer device 102. Variable font 12 may include multi-axis variable fonts that may describe an indefinite number of glyphs 15 belonging to a single font family. In addition, multi-axis variable fonts may allow a large variation in the appearance of geometric outlines for glyphs 15 within a single variable font 12. For example, a two-axis variable font may be described using a weight axis and a width axis. A font author may add as many axes and as many outlines of glyphs 15 into the variable font 12 as desired. In addition, the various axes in the multi-axis variable font 12 may be used to define animations of glyphs 15.

Memory 44 of computer device 102 may be configured for storing data and/or computer-executable instructions defining and/or associated with operating system 110, and processor 46 may execute operating system 110. An example of memory 44 can include, but is not limited to, a type of memory usable by a computer, such as random access memory (RAM), read only memory (ROM), tapes, magnetic discs, optical discs, volatile memory, non-volatile memory, and any combination thereof. An example of processor 46 can include, but is not limited to, any processor specially programmed as described herein, including a controller, microcontroller, application specific integrated circuit (ASIC), field programmable gate array (FPGA), system on chip (SoC), or other programmable logic or state machine.

Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices and/or communication networks.

Computer device 102 may also include one or more applications 10 that may present one or more variable fonts 12 on a display. Application 10 may also be configured to animate glyphs 15 using one or more variable fonts 12. Variable font 12 may support one or more axes of variation.

Each axes of variation may define a range of possible values between a minimum value and a maximum value for a particular axis. The axes of variation may define a variation design space 13 for animating glyphs 15 of variable font 12. Design space 13 may be predefined, for example, by a user (e.g., a font designer) and/or by application 10. In an implementation, a user may determine what range of design space 13 may be supported for each axis and how the design of the glyphs 15 align with the scale for each axis.

Figure 2A:
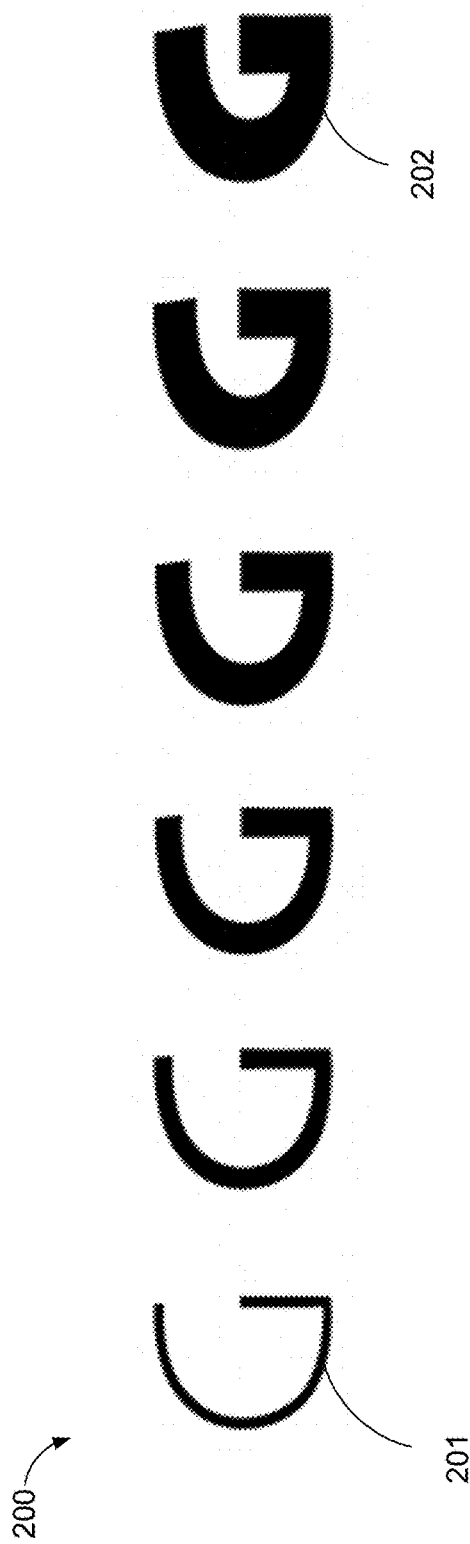
FIGS. 2A and 2B illustrate example weight variation axes of a variable font in accordance with an implementation of the present disclosure.
Figure 2B:
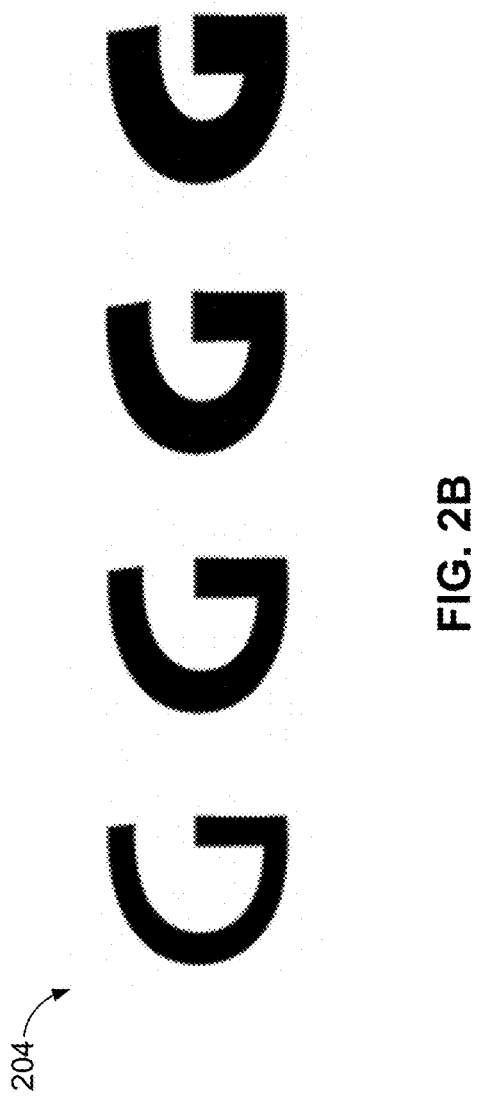

An example weight variation axis 200 is illustrated in FIG. 2A. Weight variation axis 200 illustrates an example range of a "G" glyph from a thin weight variation 201 to a black weight variation 202 along weight variation axis 200. In addition, a user may select to support a limited weight range for a glyph 15, as illustrated in FIG. 2B. FIG. 2B illustrates a limited weight range 204 of the weight variation axis 200 (FIG. 2A).

Referring back to FIG. 1, variable font 12 may also include glyph outline data 19 for glyphs 15 within design space 13. Variable font 12 may have a default instance for each glyph 15 within variable font 12. FIG. 3A illustrates an example filled default instance 302 for the "G" glyph. FIG. 3B illustrates an example outline default instance 304 for the "G" glyph. The default instance may have coordinates that corresponds to a position in design space 13 where the coordinates may be set to a default value for each axis of variation specified in variable font 12. For example, a user, such as a font designer, may predefine a default coordinate position within design space 13 for a default glyph outline for glyph 15.

Figure 4C:
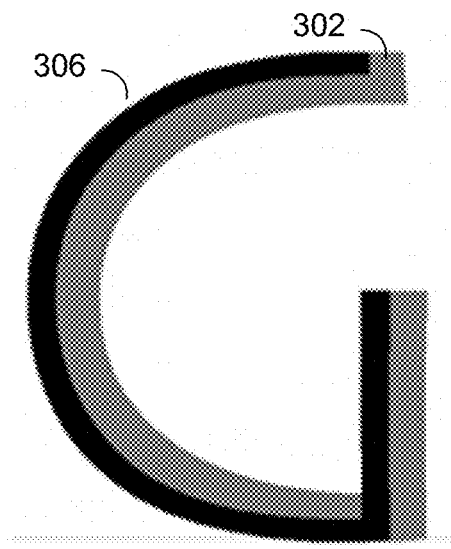
Figure 4C:
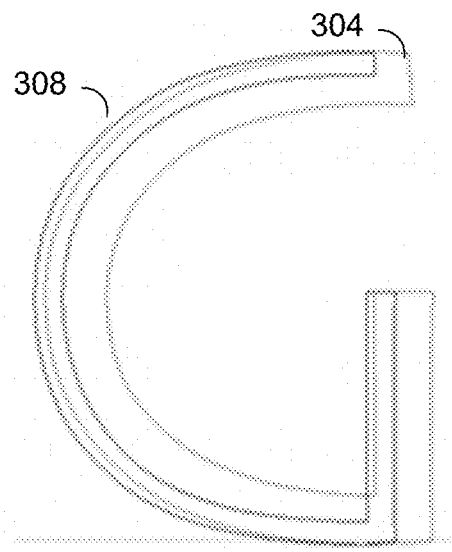
Figure 4C:
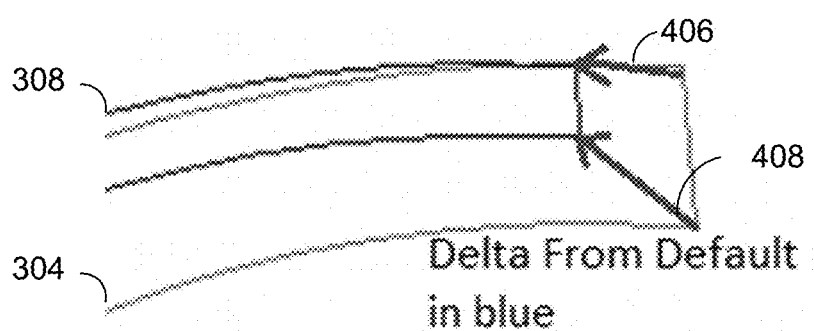

Other instances of glyph 15 may have non-default coordinate values for one or more axes of variation. For example, FIG. 3C illustrates a thin filled instance 306 of the "G" glyph and FIG. 3D illustrates an example thin outline instance 308 of the "G" glyph. The non-default instances of the glyphs may be supported by variation data based on adjustment deltas from the default value of the glyph. FIG. 4A illustrates an example a thin filled instance 306 of the "G" glyph super imposed over a default instance 302 for the "G" glyph. FIG. 4B illustrates an example thin outline instance 308 of the "G" glyph super imposed over an example outline default instance 304 for the "G" glyph. Example delta values 406 and 408 illustrating a difference from the outline default instance 304 for the "G" glyph to the thin outline instance 308 of the "G" glyph is illustrated in FIG. 4C.

Referring back to FIG. 1, a user and/or application 10 may predefine one or more master positions 17 at different coordinate positions within design space 13. Master positions 17 may also include glyph outline data 19 for glyph 15. Master positions 17 may include one or more variation deltas from the default glyph outline values for glyph 15 to the glyph outline data 19 at the master positions 17. As such, the default position and/or one or more master positions 17 within design space 13, may include full glyph outline data 19 for glyphs 15 of variable font 12. Generally, variation deltas may be provided on each variation axis. For example, variation deltas may be provided at the end values of the variation axis. Variation deltas may also be provided at selected positions along the variation axis. In addition, variation deltas may be provided in other positions in design space 13.

Figure 5A:
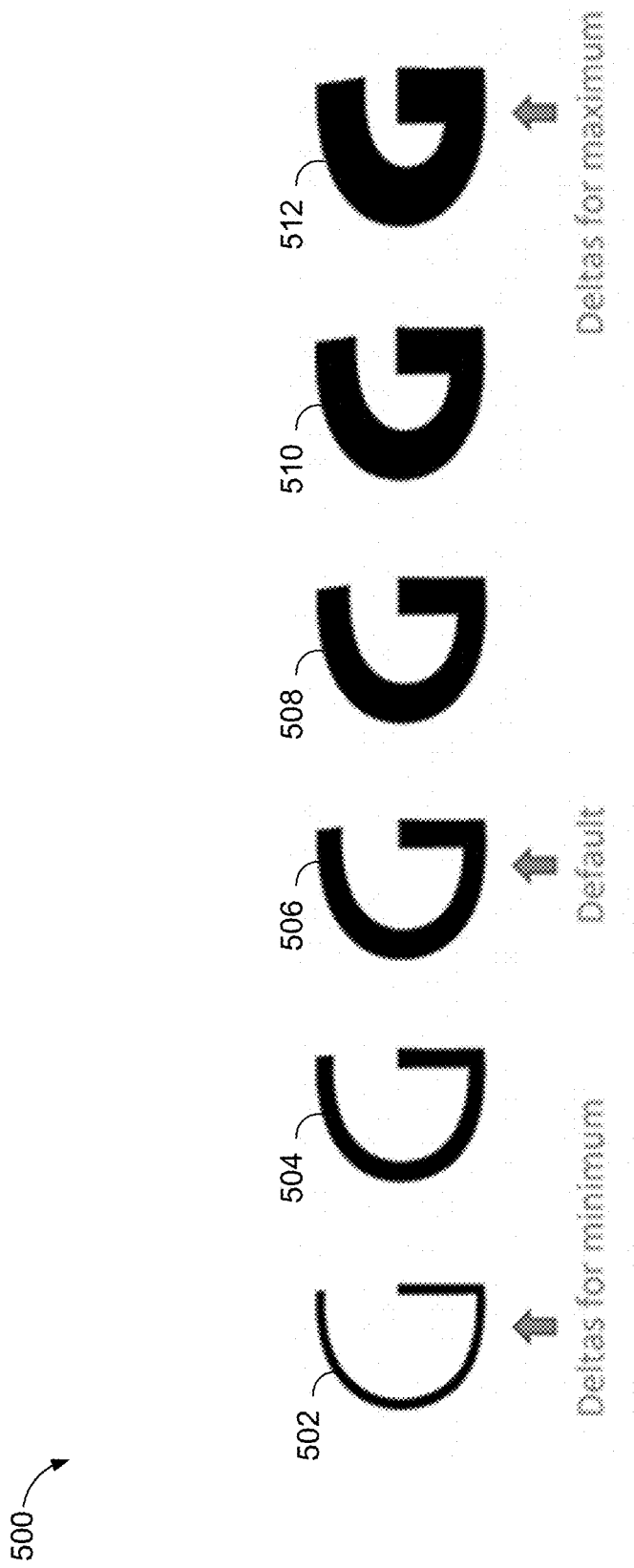
FIGS. 5A-5C illustrate example glyph outline data in accordance with an implementation of the present disclosure.

FIG. 5A illustrates an example variation axis 500 with a glyph outline 502 provided at a minimum value of variation axis 500 and a glyph outline 512 provided at a maximum value of variation axis 500. In addition, a default glyph outline 506 may be provided at a default value on variation axis 500. For any intermediate positions on variation axis 500, intermediate glyph outlines 504, 508, and 510 may be interpolated based on the glyph outline data 502, 506, and 512.

Figure 5B:
Figure 5C:
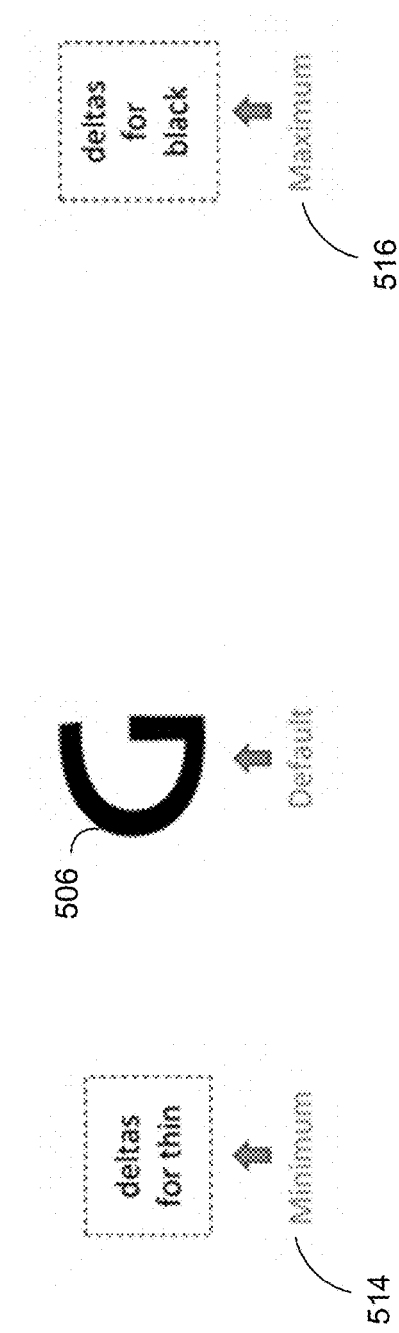

FIG. 5B illustrates example glyph outline data for two master positions 17. Each master position 17 may provide complete glyph outline data for a different position within design space 13 (FIG. 1). A glyph outline 502 is illustrated at a thin master position. In addition, a glyph outline 512 is illustrated at a black master position. FIG. 5C illustrates an example default outline 506. From the two masters positions 502 and 512 (FIG. 5B), a variable font 12 may be derived that has complete glyph outlines for a default weight 506, along with deltas for one or more non-default weights, including a minimum weight 514 and a maximum weight 516.

Figure 6:
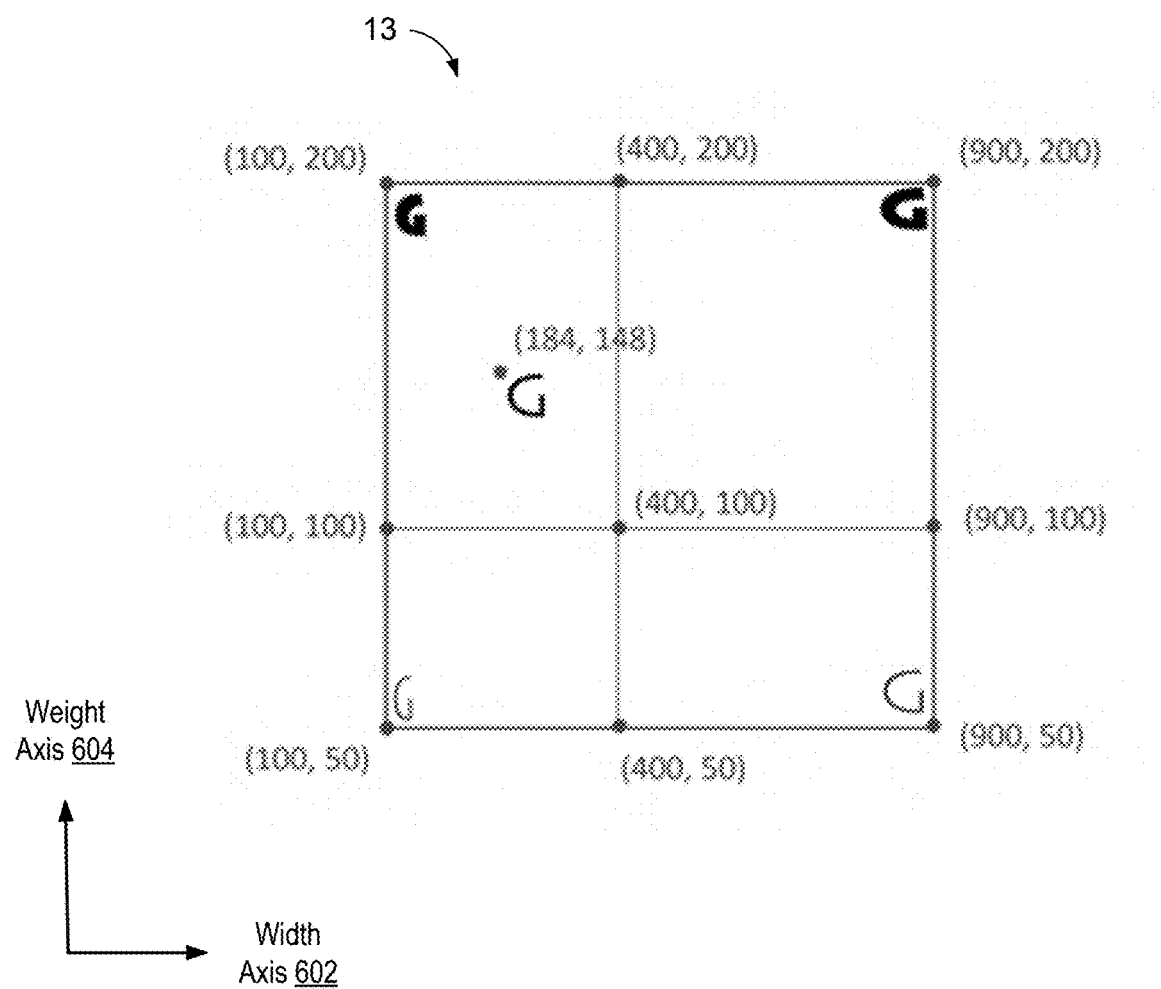
FIG. 6 illustrates an example design space for a variable font in accordance with an implementation of the present disclosure.

Referring now to FIG. 6, illustrated is an example two dimensional (2D) design space 13 with a horizontal width axis 602 of variation and a vertical weight axis 604 of variation. Design space 13 may be predefined, for example, by a font author to include outlines of glyphs along the four outer corners of design space 13, which may have coordinates (100, 200), (900, 200), (100, 50) and (900, 50), for example. From the outlines of glyphs, an instance for any point lying within design space 13 may be constructed by interpolating the glyph outline data. For example, application 10 may choose to instance a font at coordinates (184, 148) by specifying the desired design axes coordinate values (e.g., 184, 148) at runtime. The design space may correspond to the number of axis of the variable font. As such, as the number of axis of the variable font increases and/or decreases, the number of axis included in the design space may increase and/or decrease, respectively.

Referring back to FIG. 1, when animating glyphs 15 of variable font 12, application 10 may determine one or more animation parameters 14 to define the animation. Animation parameters 14 may specify the path through design space 13 that application 10 intends to use for the animation of glyph 15. Animation parameters 14 may include a starting point 16 for the animation. For example, starting point 16 may correspond to an initial set of characteristics of glyph 15, such as a default glyph outline. In addition, starting point 16 may correspond to an initial set of coordinates in design space 13. Animation parameters 14 may also include an end point 18 for the animation (e.g., an end set of coordinates in design space 13). End point 18 may also correspond to glyph outline data based on a variation delta of the default glyph outline data. In addition, animation parameters 14 may include a design path 21 between the starting point 16 and an end point 18 through design space 13. Design path 21 may be, for example, a straight line, a curved path, or a curvilinear line through design space 13. In addition, design path 21 may be any number of dimensions (e.g., 2D, 3D, four dimensional, eight dimensional). Animation parameters 14 may also include timing information 20 for the animation. Timing information may include, but is not limited to, a duration of the animation, a rate of animation, and whether the animation is continuous, looping, or auto-reversing. In an implementation, application 10 may receive input selections from a user for the various animation parameters 14. For example, application 10 may present slider user interface elements on a display allowing a user to select one or more animation parameters 14.

Application 10 may send a request 22 to text processing component 28 to animate variable font 12 based on one or more animation parameters 14. An example text processing component 28 may include DirectWrite. Request 22 may include, for example, one or more glyphs 15 to animate along with animation parameters 14 for the requested animation. For example, application 10 may want to animate a glyphs 15 presented on a display by stretching glyphs 15 outwards and inwards. Another example of animation may include glyphs 15 bouncing up and down on a display. Another example of animation may include glyphs 15 moving outwards to provide an opening where new text may be inserted and the glyphs 15 moving inwards once the text is inserted. Animation may also include zooming in or zooming out on glyphs 15. In another example, glyph 15 may contain a pictorial outline for an emoji and animation may include animating the emoji. Animating the emoji may include, for example, a smiley face that smiles or a thumbs up emoji that performs a thumbs up animation. In addition, user interface (UI) icons or other custom characters may be encoded as a variable font 12. For example, a mail application may use a variable font 12 which has an animated envelope to depict new mail.

Figure 7:
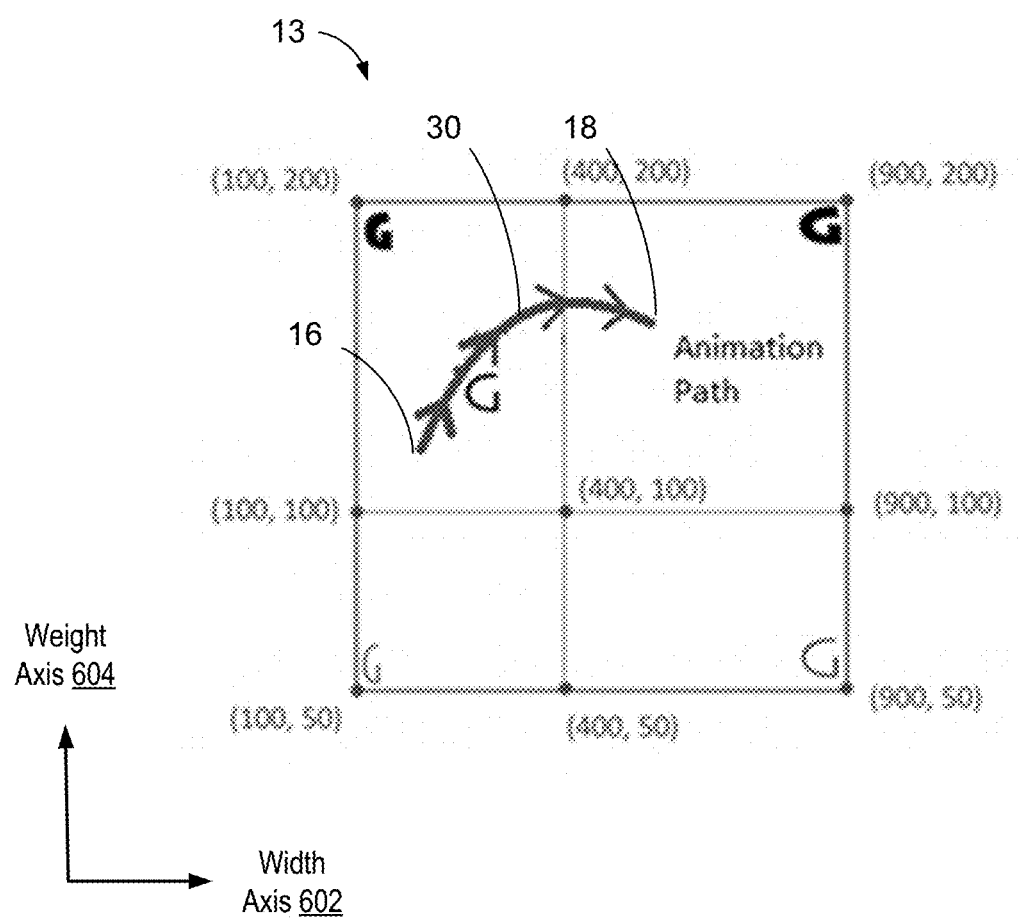
FIG. 7 illustrates an example animation path through a design space in accordance with an implementation of the present disclosure.
Figure 8:
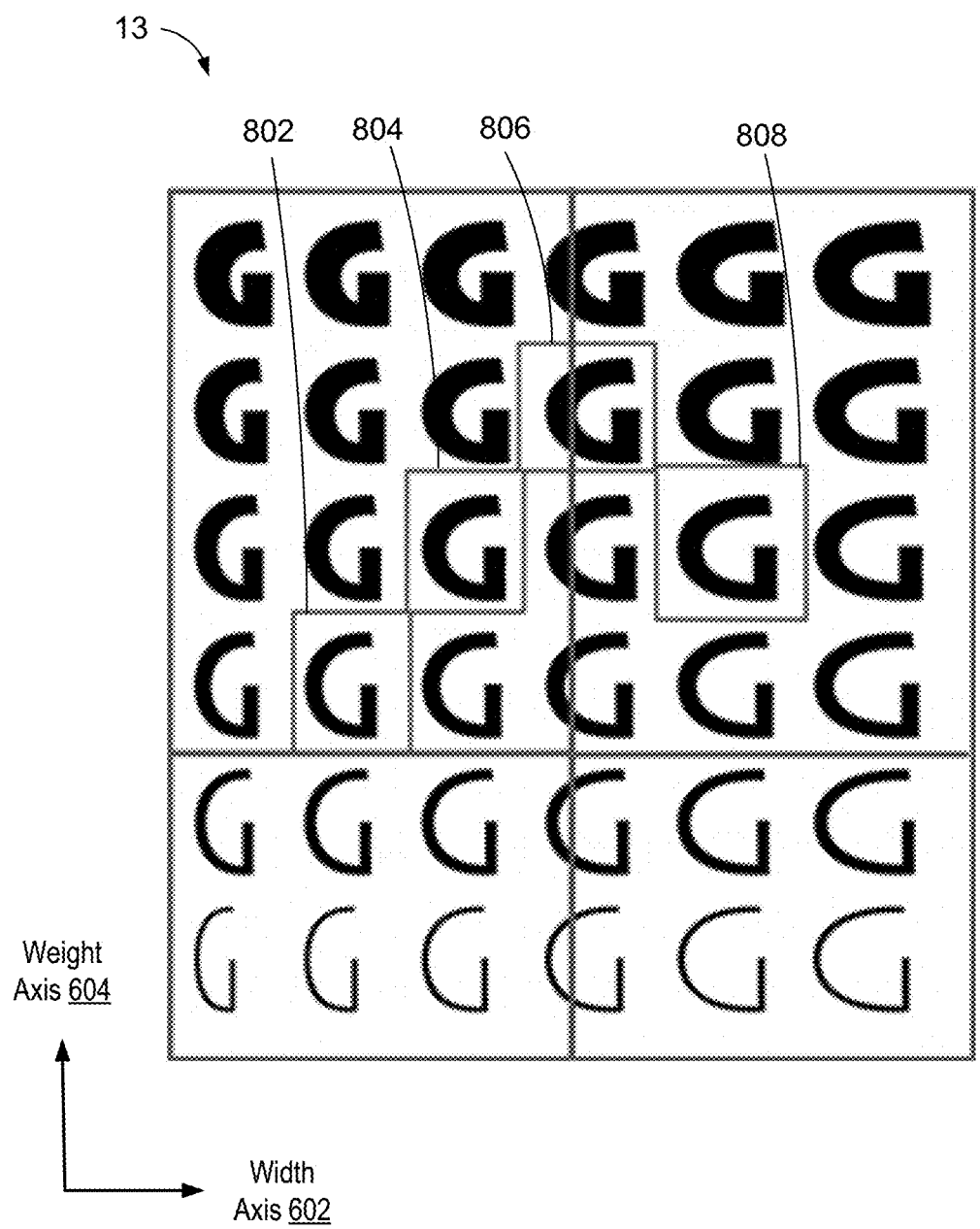
FIG. 8 illustrates an example animation path through a design space in accordance with an implementation of the present disclosure.

Text processing component 28 may determine an animation path 30 for animating the one or more glyphs 15 identified in request 22 based on the received animation parameters 14. For example, text processing component 28 may translate the design path 21 between starting point 16 and end point 18 into design space coordinates in design space 13 when determining animation path 30. Design space coordinates may also include a number of intermediate coordinates along animation path 30 between starting point 16 and end point 18. For linear animation paths 30, the starting point 16 and end point 18 may be the design space coordinates identified. For non-linear animation paths 30, the starting point 16, end point 18, and a number of intermediate coordinates between starting point 16 and end point 18 may be identified. If the animation path 30 loops, the animation path 30 may loop back to the starting point 18 when the animation path 30 reaches the end point 18. FIG. 7 illustrates an example animation path 30 between starting point 16 and end point 18 through design space 13 for the glyph "G." FIG. 8 illustrates how glyph "G" may be animated based on the animation path 30 illustrated in FIG. 8. For example, glyph outline data 802, 804, 806, and 808 may be generated based on animation path 30.

Text processing component 28 may identify a number of master positions 17 from variable font 12 that may be relevant for the desired animation path 30. As discussed above, a user and/or application 10 may predetermine a number of master positions 17 for variable font 12 within design space 13. Each master position 17 may include a region of influence 33. A region of influence 33 may span from the coordinate positions from a master position 17 to the default coordinate position. In addition, a region of influence 33 may have more than one dimension limited by a number of axes in design space 13. For example, a region of influence 33 in a one dimensional design space 13 may be a line segment. Another example may include a rectangular region of influence 33 in a two dimensional design space 13. Another example may include region of influences 33 represented by rectangular parallelepiped bounded by planes or hyperplanes respectively for three dimensional or higher design spaces 13.

Figure 9A:
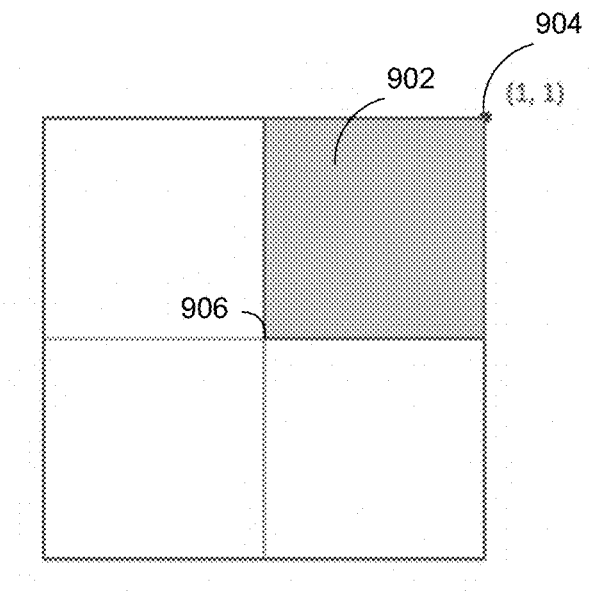
FIGS. 9A and 9B illustrate example regions of influence in a design space in accordance with an implementation of the present disclosure.
Figure 9B:
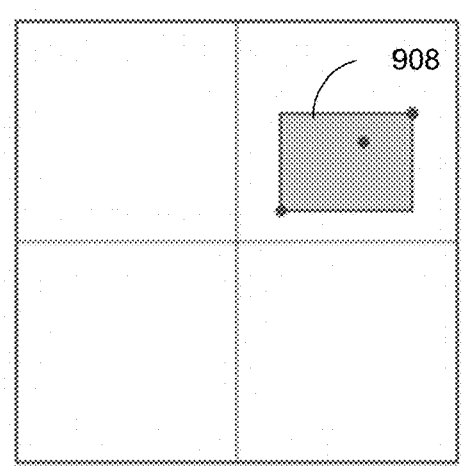

FIG. 9A illustrates an example region of influence 902 that spans from a master position 904 having coordinates (1, 1) to a default position 906. In addition, a region of influence 33 may have a restricted range selected by, for example, a user and/or application 10. FIG. 9B illustrates an example of a restricted region of influence 908. When a coordinate position is selected within a region of influence 33 of a master position 17, the glyph outline data 19 of the master position 17 may be used in interpolating the glyph outline data 19 for the selected coordinate position.

In addition, text processing component 28 may calculate a number of keyframes 32 along animation path 30. Each keyframe 32 may be associated with different glyph outline data 19 for animating glyphs 15 based on, for example, deltas of variation from a default glyph outline data corresponding to a keyframe position 34. The keyframe positions 34 may be sorted along a direction of animation path 30 based upon, for example, a distance from the animation starting point 16. As such, as the animation progresses along animation path 30, the glyph outline data 19 associated with each keyframe 32 may be presented in order.

Transitioning between keyframes 32 may define which movement of glyphs 15 may be presented on a display. When animating a given animation path 30 through design space 13, keyframes 32 may be computed at the animation starting point 16 and end point 18. Additional keyframes 32 on animation path 30 may be computed between starting point 16 and end point 18 when one or more of new regions of influence 33 are encountered by animation path 30 (e.g., the intersection of animation path 30 with the region of influence 33), when a peak value of a region of influence 33 is crossed by animation path 30, or when animation path 30 moves from a negative to positive half of a plane on a particular axis coordinate. Otherwise, glyph outline data 38 at an intermediate position 36 may be derived from two adjacent keyframes 32. For any intermediate positions 36 between keyframe positions 34, text processing component 28 may interpolate between a nearest two keyframes positions 34 along the animation path 30 and returns intermediate glyph outline data 38 for the intermediate positions 36.

Text processing component 28 may calculate a minimum number of keyframes 32 from the starting point 16 on the animation path 30 to an end point 18 of the animation path 30. The minimum number of keyframes 32 may be computed by evaluating intersection points between the animation path 30 and any instance region of influences 33 along the animation path 30. The minimum number of keyframes 32 may be a smallest number of keyframes 32 that can be used to animate glyphs 15 across the entire animation path 30, for example, based on changes in geometry defined by each region of influence.

Instead of text processing component 28 identifying all delta-sets along the animation path 30, selecting the delta-sets whose region of influence 33 affects the instance under consideration, computing a weighed sum of deltas, and displaying default outline points displaced by the corresponding deltas computed for each outline point, text processing component 28 may calculate a minimum number of keyframes 32 along animation path 30 and interpolate amongst applicable keyframes 32. Thus, the computations required to animate glyphs 15 may be reduced significantly. In addition, text processing component 28 may create intermediate glyph outline data 38 as the animation is occurring without storing intermediate glyph outline data 38. As such, animation may be achieved with a more space efficient, compact representation since the intermediate glyph outline data 38 may not be stored.

Text processing component 28 may transmit the glyph outline data 19 for keyframes positions 34 and the intermediate glyph outline data 38 for the intermediate positions 36 to graphics processing unit 24. Graphics processing unit 24 may communicate with renders 26 to present the glyph outline data 19 and the intermediate glyph outline data 38 on a display. Thus, instead of graphics processing unit 24 repeatedly redrawing the text over and over to simulate animation, animation may occur in real time or near real time as graphics processing unit 24 receives intermediate glyph outline data 38 for changes in glyph 15 as the animation path 30 progresses.

In an implementation, renders 26 may directly requests keyframes 32 from text processing component 28 and may perform the interpolation between the keyframe positions 34 directly on the graphics processing unit 24.

In an implementation, application 10 may also send a request for 2D fonts to text processing component 28 and text processing component 28 may retrieve the requested 2D fonts from font cache 42, or alternatively, font file 40 when the 2D fonts are not already in font cache 42. Text processing component 28 may return the requested 2D fonts to graphics processing unit 24. As such, text processing component 28 may treat requests to animate variable fonts 12 differently than requests for static text.

Figure 10:
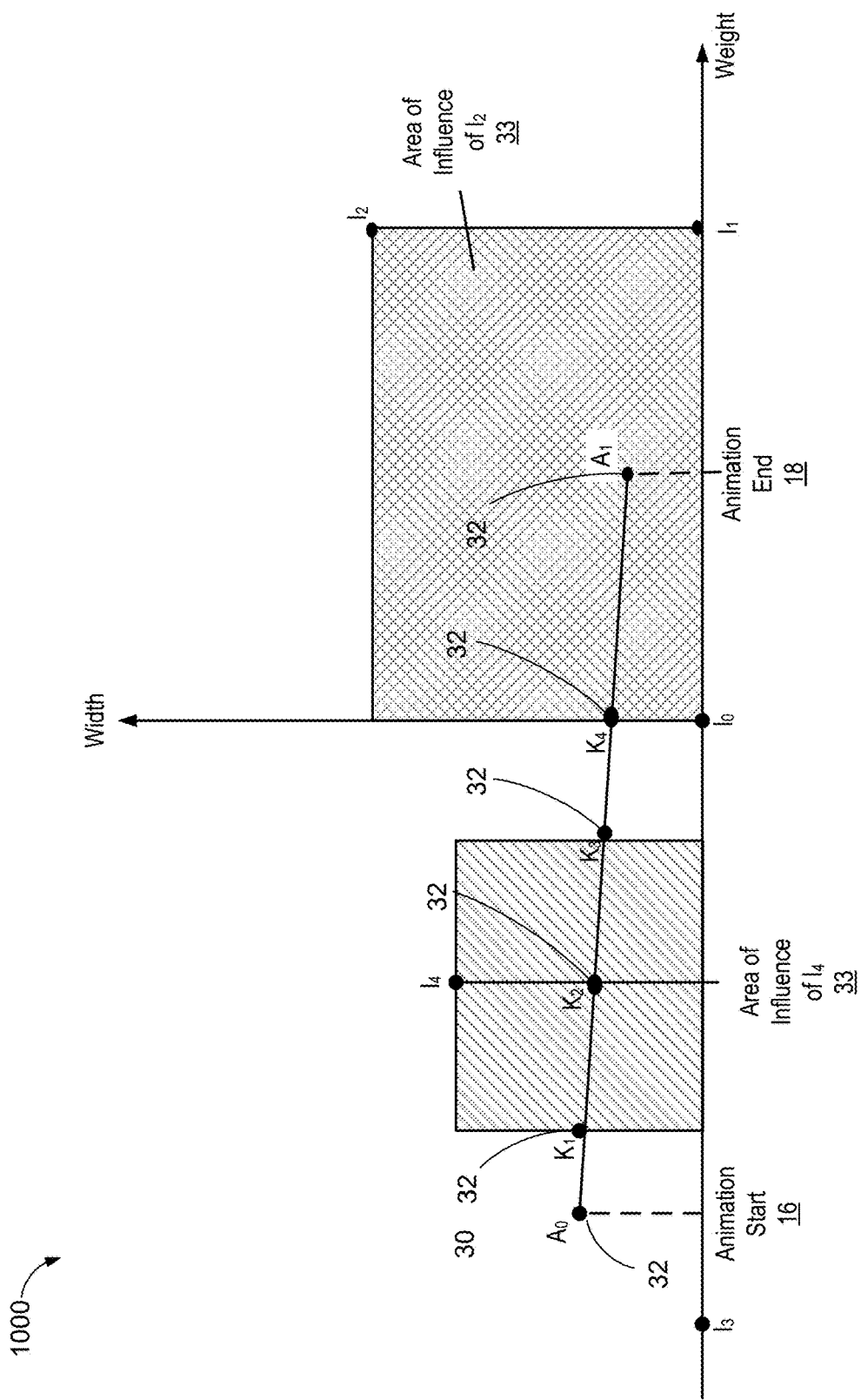
FIG. 10 illustrates a graph of an example animation path and corresponding keyframes associated with areas of influence for a two axis font in accordance with an implementation of the present disclosure.

Referring now to FIG. 10, graph 1000 illustrates example keyframes 32 (e.g., K1, K2, K3 and K4) at the intersection of example animation path 30 with example areas of influence 33 (e.g., $I_2$ and $I_4$) in an example design space 13, as calculated for a two axis variable font with the x-axis of graph 1000 defining the weight of the variable font and the y-axis of graph 200 defining the width of the variable font. The animation path 30 extends through the design space 13 from an example animation starting point 16, e.g., $A_0$, to an example animation end point 18, e.g., $A_1$.

The weight and width of the variable font may define masters $I_0$, $I_1$, $I_2$, $I_3$ and $I_4$, where instance $I_0$ specifies a default outline which is a complete outline for the glyph of the variable font. For example, $I_0$ may be a base set of characteristics for glyph 15 (e.g., a base weight and a base width). The masters $I_1$, $I_2$, $I_3$ and $I_4$ may define offsets from the default outline at $I_0$ and the respective areas of influence 33 (e.g., area of influence of $I_2$ and area of influence of $I_4$). For example, $I_1$, $I_2$, $I_3$ and $I_4$ may include other sets of values for the weight and width of glyph 15, which may vary linearly or non-linearly depending on their location in design space 13. As discussed above, the number of masters selected may be predefined by a user, such as a font designer.

When application 10 wants to animate text along the animation path 30 from animation starting point 16 to animation end point 18, e.g., from $A_0$ to $A_1$, an optimal set of keyframes 32 to accomplish the animation may be computed by evaluating each of the intersection points with the instance areas of influences 33 (e.g., I2 and I4) along the curve from $A_0$ to $A_1$. In addition, keyframes 32 may be calculated when animation path 30 crosses a peak value of an area of influence 33, or when animation path 30 moves from a negative to positive half of a plane on a particular axis coordinate. Graph 200 illustrates keyframes 32 as points K1, K2, K3, and K4 along the animation path 30, which correspond to points where the animation path 30 intersects regions of influence of instance I4 and I2 (e.g., K1, K3, and K4), a point where animation path 30 crosses a peak value of area of influence I4 (e.g., K2), and a point where animation path 30 crosses a coordinate axis (e.g., K4). Points K1, K2, K3, and K4 along with the starting position $A_0$ and end position $A_1$ of the animation path may define a minimal set of keyframes 32 required to animate across the whole animation path 30.

When the variable font has more than two axis, the areas of influences defined by different masters may have higher dimensionality and may be better described by rectangular parallelepipeds of three or higher dimensions, bounded by planes or hyperplanes, respectively. The keyframes 32 may be computed by intersecting the animation path 30 with these higher dimension planes and hyper-planes.

Figure 11:
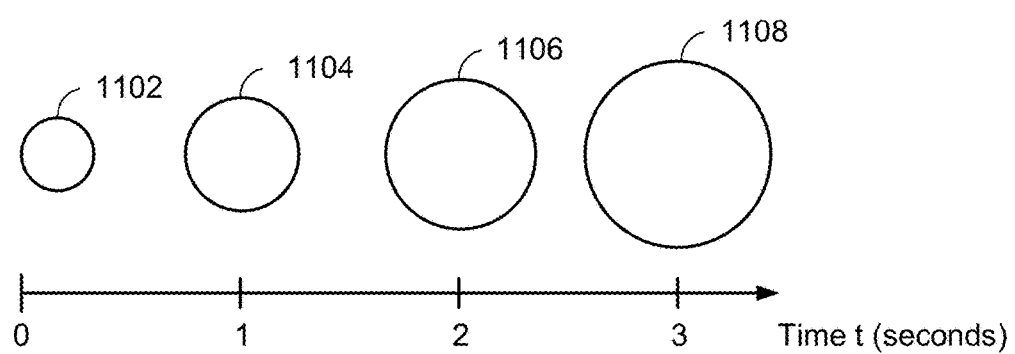
FIG. 11 illustrates a graph of an example of animating a font over time in accordance with an implementation of the present disclosure.

Referring now to FIG. 11, illustrated is an example of animating font in accordance with an implementation. Generally when applications animate an object on a display, applications redraw that object multiple times on the display, for the duration of the animation, by slightly changing the geometric or appearance properties (such as color) of the object each time the object is redrawn by the application. For example, consider drawing an expanding circle on the screen. The circle may circle 1102 may begin with a radius of 10 units and changes to a circle 1108 with 25 units over a duration of 3 seconds.

Typically, to animate, the redraw rate is around 60 times per second and may be referred to as frames per second (FPS). In the circle example illustrated in FIG. 11, between time t=0 seconds and t=1 second, the application will endeavor to redraw the circle 60 times by incrementing the radius of the circle each time it draws the circle.

In the circle example, since the radius changes from 10 units to 25 units over 3 seconds and no other perturbations to the radius may be required, the radius may be computed at any time in between t=0 and t=3 by interpolating between the radius values of 10 and 25. For example, the starting radius may equal 10, the ending radius may equal 25, and the change in radius may be calculated by subtracting the starting radius from the ending radius to equal 15. Thus, during an animation of 3 seconds, the rate of radius change may equal 5 units per second. The rate of radius change may be calculated by dividing the change in radius by duration of animation.

As such, the radius values for any time 't' between 0 and 3 seconds may be interpolated using the formula: Radius at time t=Starting Radius+t*rate of radius change. In the circle example, the radius and center position a t=0 and t=3 secs needs to be specified. As such, we have a keyframe at t=0 and t=3 seconds. The intermediate circle positions 1104 and 1106 may be computed using linear or non-linear interpolations based on the formula above, for example.

Figure 12:
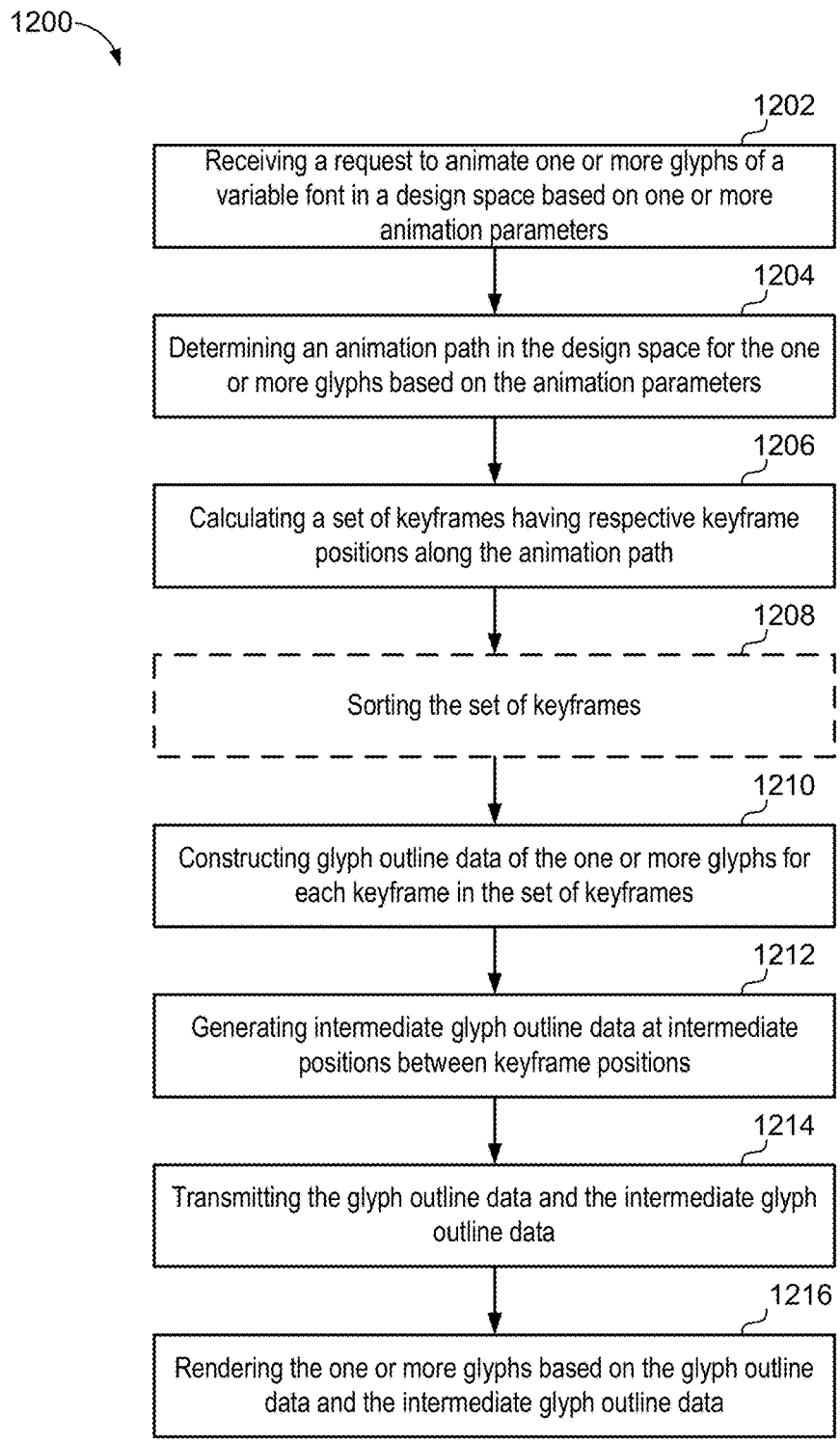
FIG. 12 is a flow chart of a method for animating multi-axis fonts in accordance with an implementation of the present disclosure.

Referring now to FIG. 12, a method 1200 for animating variable fonts may be implemented on operating system 110 (FIG. 1) of computer device 102 (FIG. 1).

At 1202, method 1200 may include receiving a request to animate one or more glyphs of a variable font in a design space based on one or more animation parameters. A variable font may support one or more axes of variation. For example, variable fonts may include, but are not limited to, a 2D font, a 3D font, a four dimensional font, and an eight dimensional font. Each axes of variation may define a range of possible values between a minimum value and a maximum value for a particular axis. The axes of variation may define a variation design space for animating glyphs of the variable font. The design space may be predefined, for example, by a user (e.g., a font designer) and/or by an application. In an implementation, a user may determine what range of the design space may be supported for each axis and how the design of the glyphs may align with the scale for each axis.

In an implementation, text processing component 28 (FIG. 1) may receive a request 22 (FIG. 1) for animating glyphs 15 (FIG. 1) of variable font 12 (FIG. 1) from application 10 (FIG. 1). For example, application 10 may want to animate an emoji, animate a font face, zoom in on a glyph, zoom out on a glyph, switch between bold and regular text, stretch glyphs inwards and/or outwards, move glyphs to form an opening to insert text, have glyphs bounce up and down on a display, and rotate a glyph, among other possible animations. Request 22 may include one or more animation parameters 14 (FIG. 1) that identify a range of animation for the glyphs 15. For example, animation parameters 14 may include, but are not limited to, an animation starting point 16, an animation end point 18, timing information 20 for the animation (e.g., a speed of animation, whether the animation is continuous, a start time and end time for the animation), and/or a design path 21 through a design space 13 for the animation.

At 1204, method 1200 may include determining an animation path in the design space for the one or more glyphs based on the animation parameters. For example, text processing component 28 may translate the design path 21 between the starting point 16 and the end point 18 into geometric parameters in design space 13 to determine an animation path 30 (FIG. 1) for glyph 15. Animation path 30 may be a curve, a straight line, or a curvilinear line through a design space 13 that connects the starting point 16 to the end point 18 of the animation. For non-linear (e.g., quadratic or higher orders) animation curves may be approximated by piecewise linear pieces with keyframes for each linear sub-path computed as for linear animation curves.

At 1206, method 1200 may include calculating a set of keyframes having respective keyframe positions along the animation path. Text processing component 28 may calculate the set of keyframes 32, each having a corresponding keyframe position 34, along the animation path 30. Keyframe positions 34 may include the animation starting point 16, the animation end point 18, and locations on the animation path 30 where the geometry changes non-linearly for the geometric animation data. For example, keyframes 32 may be computed at the animation starting point 16 and end point 18. In addition, keyframes 32 may be computed when one or more of new regions of influence 33 are encountered by animation path 30 (e.g., the intersection of animation path 30 with the region of influence 33), when a peak value of a region of influence 33 is crossed by animation path 30, or when animation path 30 moves from a negative to positive half of a plane on a particular axis coordinate. For example, keyframe positions 34 may be determined by evaluating intersection points between the animation path 30 and any instance region of influences 33 along the animation path 30. In addition, text processing component 28 may calculate a minimum number of keyframes 32 from the starting point 16 on the animation path 30 to an end point 18 of the animation path 30. The minimum number of keyframes 32 may be computed by evaluating the intersection points with an instance regions of influence 33 along the animation path 30. The minimum number of keyframes 32 may be a smallest number of keyframes 32 that may be used to animate glyphs 15 across the entire animation path 30, for example, based on non-linear changes in geometry defined by each region of influence 33.

When the variable font has more than two axis, the areas of influences defined by different masters may have higher dimensionality and may be better described by rectangular parallelepipeds of three or higher dimensions, bounded by planes or hyperplanes, respectively. The keyframes 32 may be computed by intersecting the animation path 30 with these higher dimension planes and hyper-planes.

At 1208, method 1200 may optionally include sorting the set of keyframes. Text processing component 28 may sort the keyframe 32 based on, for example, the keyframe positions 34. The keyframe positions 34 may be sorted along a direction of animation path 30 based upon, for example, a distance from the animation starting point 16. As such, as the animation progresses, each keyframe 32 may be presented in order along animation path 30.

At 1210, method 1200 may include constructing glyph outline data of the one or more glyphs for each keyframe in the set of keyframes. Text processing component 28 may determine glyph outline data 19 for each of the keyframes 32. Each keyframe 32 may be associated with different glyph outline data 19 of glyphs 15 based on, for example, deltas of variation from a default glyph outline data corresponding to a keyframe position 34.

At 1212, method 1200 may include generating intermediate glyph outline data at intermediate positions between keyframe positions. Text processing component 28 may identify one or more intermediate positions 36 between keyframe positions 34. For any intermediate positions 36, text processing component 28 may interpolate between a nearest two keyframe positions 34 (e.g., one on each side of the intermediate position 36) along the animation path 30 and return the corresponding intermediate glyph outline data 38 for the intermediate positions 36. Text processing component 28 may create intermediate glyph outline data 38 as the animation is occurring without storing intermediate glyph outline data 38. As such, animation may be achieved with a more space efficient, compact representation since the intermediate glyph outline data 38 may not be stored.

At 1214, method 1200 may include transmitting the glyph outline data and the intermediate glyph outline data and, at 1216, method 1200 may include rendering the one or more glyphs based on the glyph outline data and the intermediate glyph outline data. Text processing component 28 may transmit the glyph outline data 19 for keyframes positions 34 and the intermediate glyph outline data 38 for the intermediate positions 36 to graphics processing unit 24. Graphics processing unit 24 may communicate with renders 26 to present the glyph outline data 19 and the intermediate glyph outline data 38 on a display. Thus, instead of the graphics processing unit 24 repeatedly redrawing the text over and over to simulate animation, animation may occur in real time or near real time as graphics processing unit 24 receives intermediate glyph outline data 38 for changes in glyph 15 as the animation path 30 progresses.

Figure 13:
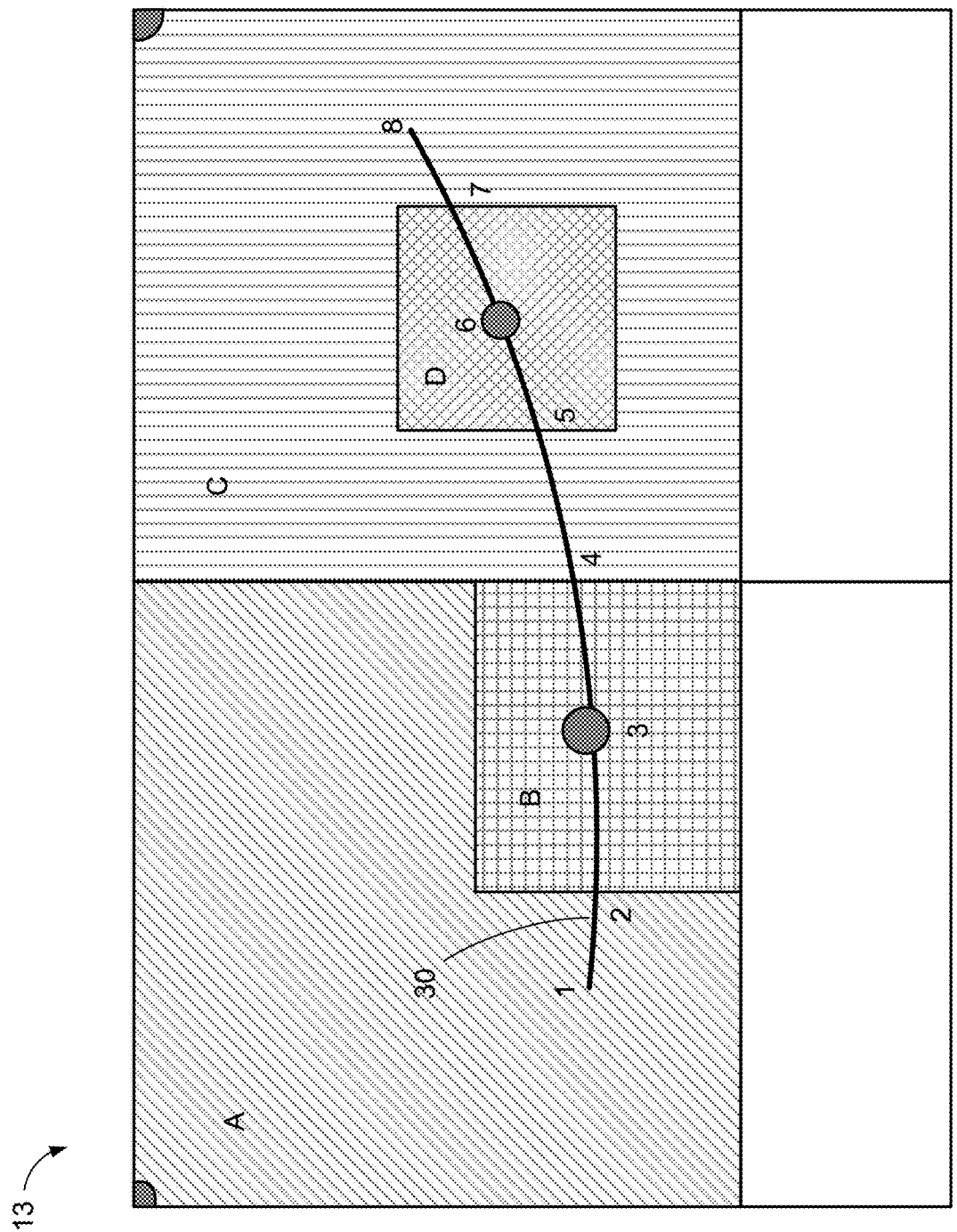
FIG. 13 illustrates an example animation path through multiple regions of influence in accordance with an implementation of the present disclosure.

Referring now to FIG. 13, illustrated is an example animation path 30 through design space 13 in accordance with an implementation. Animation path 30 may start at point 1 in region of influence A and may end at point 8 in region of influence C. In addition, animation path 30 may pass through regions of influence B and D and cross the vertical axis at point 4.

Keyframes may be located at the start of the animation curve (e.g., keyframe 1) and at the end of the animation curve (e.g., keyframe 8). In addition, keyframes may be located at the point of entry into a new region of influence (e.g., keyframes 2, 4, and 5). Keyframes may also be located at the point of exiting a region of influence (e.g., keyframes 4 and 7). Keyframes may be located at while crossing a coordinate axis (e.g., keyframe 4). In addition, keyframes may be located at the point of crossing the peak coordinate of a region of influence (e.g., keyframes 3 and 6). As such, animation path 30 may need keyframes 1, 2, 3, 4, 5, 6, 7, and 8 in order to animate one or more glyphs across the entire animation path 30.

In addition, keyframes 1, 2, 3, 4, 5, 6, 7, and 8 may be ordered along the direction of animation path 30. If animation path 30 was to start at point 8 and end at point 1, the order of the keyframes may need to be reversed. For example, keyframe 8 may change to keyframe 1, keyframe 7 may change to keyframe 2, and keyframe 6 may change to keyframe 3, until all of the keyframes are reordered based on the direction of the animation path 30.

Figure 14:
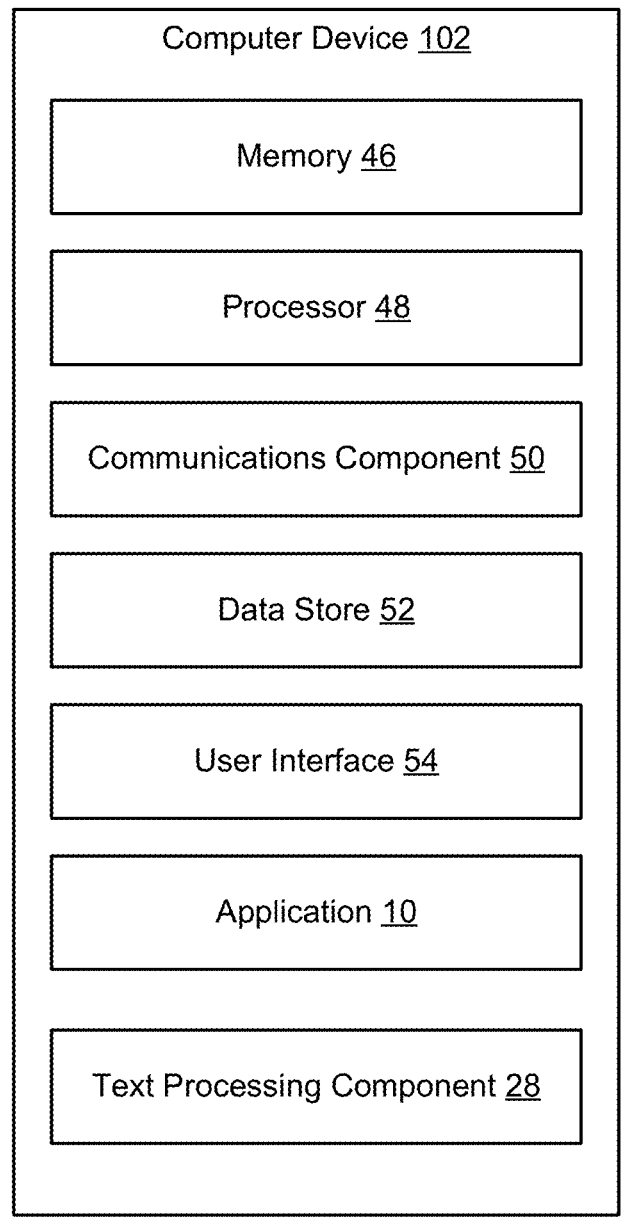
FIG. 14 is a schematic block diagram of an example device in accordance with an implementation of the present disclosure.

Referring now to FIG. 14, illustrated is an example computer device 102 in accordance with an implementation, including additional component details as compared to FIG. 1. In one example, computer device 102 may include processor 46 for carrying out processing functions associated with one or more of components and functions described herein. Processor 46 can include a single or multiple set of processors or multi-core processors. Moreover, processor 46 can be implemented as an integrated processing system and/or a distributed processing system.

Computer device 102 may further include memory 44, such as for storing local versions of applications being executed by processor 46. Memory 44 can include a type of memory usable by a computer, such as random access memory (RAM), read only memory (ROM), tapes, magnetic discs, optical discs, volatile memory, non-volatile memory, and any combination thereof. Additionally, processor 46 and memory 44 may include and execute operating system 110 (FIG. 1).

Further, computer device 102 may include a communications component 50 that provides for establishing and maintaining communications with one or more parties utilizing hardware, software, and services as described herein. Communications component 50 may carry communications between components on computer device 102, as well as between computer device 102 and external devices, such as devices located across a communications network and/or devices serially or locally connected to computer device 102. For example, communications component 50 may include one or more buses, and may further include transmit chain components and receive chain components associated with a transmitter and receiver, respectively, operable for interfacing with external devices.

Additionally, computer device 102 may include a data store 52, which can be any suitable combination of hardware and/or software, that provides for mass storage of information, databases, and programs employed in connection with implementations described herein. For example, data store 52 may be a data repository for applications 10 (FIG. 1), Text processing component 28 (FIG. 1), font file 40 (FIG. 1), and/or font cache 42 (FIG. 1).

Computer device 102 may also include a user interface component 54 operable to receive inputs from a user of computer device 102 and further operable to generate outputs for presentation to the user. User interface component 54 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 54 may include one or more output devices, including but not limited to a display, a speaker, a haptic feedback mechanism, a printer, any other mechanism capable of presenting an output to a user, or any combination thereof.

In an implementation, user interface component 54 may transmit and/or receive messages corresponding to the operation of applications 10, text processing component 28, font file 40, and/or font cache 42. In addition, processor 46 executes applications 10, text processing component 28, font file 40, and/or font cache 42, and memory 44 or data store 52 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
    a memory to store data and instructions;
    a processor in communication with the memory; and
    an operating system in communication with the memory and the processor, wherein the system is operable to:
        receive a request to animate one or more glyphs of a variable font in space based on one or more animation parameters;
        determine an animation path in the design space for the one or more glyphs based on the animation parameters;
        calculate a set of keyframes having respective keyframe positions along the animation path by:
            determining one or more master positions in the design space;
            determining one or more regions of influence from the one or more master positions along the animation path, wherein each region of influence defines an area where a geometry of the variable font changes non-linearly;
            identifying one or more intersection points of the one or more master positions with the one or more regions of influence; and
            at each intersection point of the one or more intersection points, assigning a keyframe position;
        construct glyph outline data of the one or more glyphs for each keyframe in the set of keyframes;
        generate intermediate glyph outline data at one or more intermediate positions between the keyframe positions; and
        transmit the glyph outline data and the intermediate glyph outline data.

2. The computer device of claim 1, wherein the operating system is further operable to generate intermediate glyph outline data by:
    at an intermediate position, determine two nearest keyframe positions on either side of the intermediate position and generate the intermediate glyph outline data for the intermediate position by interpolating between the glyph outline data for the two nearest keyframe positions.

3. The computer device of claim 1, wherein the operating system is further operable to:
    render the glyph outline data and the intermediate glyph outline data; and
    present the rendered glyph outline data and the intermediate glyph outline data on a display.

4. The computer device of claim 1, wherein the animation parameters include one or more of a starting point, an endpoint, timing information, and a design path.

5. The computer device of claim 1, wherein the one or more master positions define offset glyph outline data of the one or more glyphs from a default outline of the one or more glyphs.

6. The computer device of claim 1, wherein the set of keyframes is a minimal set of keyframes required to animate across the animation path.

7. The computer device of claim 1, wherein the variable font is a multi-axis font.

8. The computer device of claim 7, wherein when the variable font includes more than two axis, the keyframes are calculated by intersecting the animation path with planes of the variable font axes.

9. A method for animating variable fonts, comprising:
    receiving, at an operating system executing on a computer device, a request to one or more glyphs of a variable font in a design space based on one or more animation parameters;
    determining, at the operating system, an animation path in the design space for the one or more glyphs based on the animation parameters;
    calculating a set of keyframes having respective keyframe positions along the animation path by:
        determining one or more master positions in the design space;
        determining one or more regions of influence from the one or more master positions along the animation path, wherein each region of influence defines an area where a geometry of the variable font changes non-linearly;
        identifying one or more intersection points of the one or more master positions with the one or more regions of influence; and
        at each intersection point of the one or more intersection points, assigning a keyframe position;
    constructing glyph outline data of the one or more glyphs for each keyframe in the set of keyframes;
    generating intermediate glyph outline data at one or more intermediate positions between the keyframe positions; and transmitting the glyph outline data and the intermediate glyph outline data.

10. The method of claim 9, wherein generating the intermediate glyph outline data further comprises:
at an intermediate position, determining two nearest keyframe positions one either side of the intermediate position and generating the intermediate glyph outline data for the intermediate position by interpolating between the glyph outline data for the two nearest keyframe positions.

11. The method of claim 9, further comprising:
rendering the glyph outline data and the intermediate glyph outline data; and
presenting the rendered glyph outline data and the intermediate glyph outline data on a display.

12. The method of claim 9, wherein the animation parameters include one or more of a starting point, an endpoint, timing information, and a design path.

13. The method of claim 9, wherein the one or more master positions define offset glyph outline data of the one or more glyphs from a default outline of the one or more glyphs.

14. The method of claim 9, wherein the set of keyframes is a minimal set of keyframes required to animate across the animation path.

15. The method of claim 9, wherein the variable font is a multi-axis font.

16. The method of claim 15, wherein when the variable font includes more than two axis, the keyframes are calculated by intersecting the animation path with planes of the variable font axes.

17. A non-transitory computer-readable medium storing instructions executable by a computer device, comprising:
at least one instruction for causing the computer device to receive a request to animate one or more glyphs of a variable font in a design space based on one or more animation parameters;
at least one instruction for causing the computer device to determine an animation path in the design space for the one or more glyphs based on the animation parameters;
at least one instruction for causing the computer device to calculate a set of keyframes having respective keyframe positions along the animation path by:
determining one or more master positions in the design space;
determining one or more regions of influence from the one or more master positions along the animation path, wherein each region of influence defines an area where a geometry of the variable font changes non-linearly;
identifying one or more intersection points of the one or more master positions with the one or more regions of influence; and
at each intersection point of the one or more intersection points, assigning a keyframe position;
at least one instruction for causing the computer device to construct glyph outline data for the one or more glyphs for each keyframe in the set of keyframes;
at least one instruction for causing the computer device to generate intermediate glyph outline data at one or more intermediate positions between the keyframe positions; and
at least one instruction for causing the computer device to transmit the glyph outline data and the intermediate glyph outline data.

18. The computer-readable medium of claim 17, wherein the computer device is further operable to generate intermediate glyph outline data by:
at an intermediate position, determining two nearest keyframe positions on either side of the intermediate position and generate the intermediate glyph outline data for the intermediate position by interpolating between the glyph outline data for the two nearest keyframe positions.

19. The computer-readable medium of claim 17, further comprising:
at least one instruction for causing the computer device to render the glyph outline data and the intermediate glyph outline data; and
at least one instruction for causing the computer device to present the rendered glyph outline data and the intermediate glyph outline data on a display.

20. The computer-readable medium of claim 17, wherein the one or more master positions define offset glyph outline data of the one or more glyphs from a default outline of the one or more glyphs.

* * * * *